United States Patent
Hwang et al.

(10) Patent No.: US 8,537,325 B2
(45) Date of Patent: Sep. 17, 2013

(54) DISPLAY APPARATUS HAVING AN OUTWARDLY CURVED DAM STRUCTURE AND METHOD OF MANUFACTURING THE SAME

(75) Inventors: Jeong-Ho Hwang, Yongin (KR); Sang-Hee Lee, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 321 days.

(21) Appl. No.: 13/006,593

(22) Filed: Jan. 14, 2011

(65) Prior Publication Data

US 2011/0304812 A1 Dec. 15, 2011

(30) Foreign Application Priority Data

Jun. 10, 2010 (KR) .................. 10-2010-0055104

(51) Int. Cl.
*G02F 1/1339* (2006.01)
*C09J 5/02* (2006.01)

(52) U.S. Cl.
USPC .......................................... 349/155; 156/314

(58) Field of Classification Search
USPC ............... 349/155; 156/314, 315, 275.7, 291
See application file for complete search history.

(56) References Cited

U.S. PATENT DOCUMENTS

| | | | |
|---|---|---|---|
| 6,867,546 B1 * | 3/2005 | Zhang et al. | 313/584 |
| 7,751,019 B2 * | 7/2010 | Cho et al. | 349/155 |
| 8,184,255 B2 * | 5/2012 | Hsu et al. | 349/154 |
| 8,188,509 B2 * | 5/2012 | Lee | 257/100 |
| 2005/0155704 A1 * | 7/2005 | Yokajty et al. | 156/295 |
| 2007/0046874 A1 * | 3/2007 | Adachi et al. | 349/122 |
| 2007/0176558 A1 * | 8/2007 | Kao et al. | 313/587 |
| 2009/0009678 A1 * | 1/2009 | Cao | 349/58 |
| 2009/0011197 A1 | 1/2009 | Matsuhira | |
| 2009/0086120 A1 | 4/2009 | Sasaki et al. | |
| 2009/0174317 A1 | 7/2009 | Jung et al. | |
| 2009/0183819 A1 * | 7/2009 | Matsuhira | 156/99 |
| 2009/0283211 A1 | 11/2009 | Matsuhira | |
| 2010/0134713 A1 * | 6/2010 | Toyoda et al. | 349/58 |

(Continued)

FOREIGN PATENT DOCUMENTS

| | | |
|---|---|---|
| JP | 2000-275621 | 10/2000 |
| JP | 2000275621 | 10/2000 |

(Continued)

OTHER PUBLICATIONS

Korean Notice of Allowance issued Mar. 29, 2012 in connection with Korean Patent Application Serial No. 10-2010-0055104 and Request for Entry of the Accompanying Office Action.

(Continued)

*Primary Examiner* — Akm Enayet Ullah
(74) *Attorney, Agent, or Firm* — Robert E. Bushnell, Esq.

(57) ABSTRACT

A display device including a display panel to display an image on a display surface of the display panel; a transparent protective member arranged on the display surface; a dam unit that is interposed between the display panel and the transparent protective member and is formed adjacent to the edges of the display panel; and a transparent filling layer that fills a space formed by the display panel, the transparent protective member, and the dam unit, wherein walls of the dam unit are outward bent in a direction extending from an inside of the display panel to an outside of the display panel.

18 Claims, 7 Drawing Sheets

(56) References Cited

U.S. PATENT DOCUMENTS

| | | | |
|---|---|---|---|
| 2011/0025621 A1* | 2/2011 | Kawabe | 345/173 |
| 2011/0031479 A1* | 2/2011 | Ryu et al. | 257/40 |
| 2011/0126989 A1* | 6/2011 | Farah | 156/701 |
| 2012/0009393 A1* | 1/2012 | Koehler et al. | 428/192 |

FOREIGN PATENT DOCUMENTS

| | | |
|---|---|---|
| JP | 2005055641 | 3/2005 |
| JP | 2008-241727 | 10/2008 |
| JP | 2008241727 | 10/2008 |
| JP | 2009-8703 A | 1/2009 |
| JP | 2009-048214 | 3/2009 |
| JP | 2009048214 | 3/2009 |
| KR | 20070119228 A | 12/2007 |
| KR | 1020090032961 | 4/2009 |
| KR | 10-0932982 B1 | 12/2009 |

OTHER PUBLICATIONS

Korean Office action issued by Korean Industrial Property Office on Jul. 27, 2011, corresponding to KR 10-2010-0055104 and Request for Entry.

* cited by examiner

DISPLAY APPARATUS HAVING AN OUTWARDLY CURVED DAM STRUCTURE AND METHOD OF MANUFACTURING THE SAME

CROSS-REFERENCE TO RELATED APPLICATION

This application claims the benefit of Korean Patent Application No. 10-2010-0055104, filed on Jun. 10, 2010, in the Korean Intellectual Property Office, the disclosure of which is incorporated herein in its entirety by reference.

BACKGROUND

1. Field

An aspect of the present invention relates to a display apparatus and a method of manufacturing the same.

2. Description of the Related Art

Mobile devices having display panels, such as mobile phones, personal digital assistants (PDAs), digital cameras, or the like, are widely used nowadays. Since a mobile device is frequently used outdoors, display panels in the mobile device are required to have characteristics including appropriate brightness and excellent outdoor visibility. For improvement of such characteristics, a technique of filling with a transparent polymer a space between a display panel and a protective member, such as a window, for protecting the display panel has recently been introduced.

SUMMARY

An aspect of the present invention provides a method of evenly filling a space between a display panel and a protective member with a transparent polymer.

According to an aspect of the present invention, there is provided a display device including a display panel to display an image on a display surface of the display panel; a transparent protective member arranged on the display surface; a dam unit interposed between the display panel and the transparent protective member and formed to correspond to edges of the display panel; and a transparent filling layer that fills a space formed by the display panel, the transparent protective member, and the dam unit, wherein walls of the dam unit are outwardly bent in a direction extending from an inside surface of the display panel to an outside surface of the display panel.

According to another aspect of the present invention, the display panel may have a shape of a polygon, and the walls of the dam unit may be formed such that, a distance between the edges of the inner walls of the dam unit and the edges of the polygon increase from the centers of the edges of the polygon to the vertexes of the polygon.

According to another aspect of the present invention, outer walls of the dam unit may be formed parallel with inner walls of the dam unit. Alternatively, the outer walls of the dam unit may be formed close to the edges of the display panel.

According to another aspect of the present invention, the dam unit may be formed by ink-printing a pattern of the dam unit on the transparent protective member. Alternatively, the dam unit may be formed by taping a pattern of the dam unit on the transparent protective member. Alternatively, the dam unit may be formed by applying a hardening resin on the transparent protective member and hardening the hardening resin.

According to another aspect of the present invention, the transparent protective member may be a glass substrate, and the transparent filling layer may be formed by hardening a liquid-type transparent filling.

According to another aspect of the present invention, the transparent filling may be an acrylic material or resin.

According to another aspect of the present invention, the inner walls of the dam unit may be concave.

According to another aspect of the present invention, there is provided a method of manufacturing a display device, the method including forming a dam unit on a transparent protective member, arranged on a display panel, close to the edges of the display panel, such that walls of the dam unit are outwardly bent extending in a direction from an inside of the display panel to an outside of the display panel; applying a liquid-type transparent filling onto at least one of the transparent protective member and the display panel, such that the dam unit and the transparent filling are interposed between the transparent protective member and the display panel; pressing the transparent protective member and the display panel toward each other; and hardening the liquid-type transparent filling.

According to another aspect of the present invention, the display panel may have a shape of a polygon, and the walls of the dam unit may be formed such that, a distance between edges of the walls of the dam unit and edges of the polygon increase from centers of the edges of the polygon to the vertexes of the polygon.

According to another aspect of the present invention, the outer walls of the dam unit may be formed parallel with the inner walls of the dam unit. Alternatively, the outer walls of the dam unit may be formed near the edges of the display panel.

According to another aspect of the present invention, the dam unit may be formed by ink-printing a pattern of the dam unit on the transparent protective member.

According to another aspect of the present invention, the dam unit may be formed by taping a pattern of the dam unit on the transparent protective member.

According to another aspect of the present invention, the forming of the dam unit may include applying a hardening resin on the transparent protective member; and hardening the hardening resin.

According to another aspect of the present invention, the transparent protective member may be a glass substrate.

According to another aspect of the present invention, the transparent filling may be an acrylic material or resin.

According to another aspect of the present invention, the inner walls of the dam unit may be concave.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
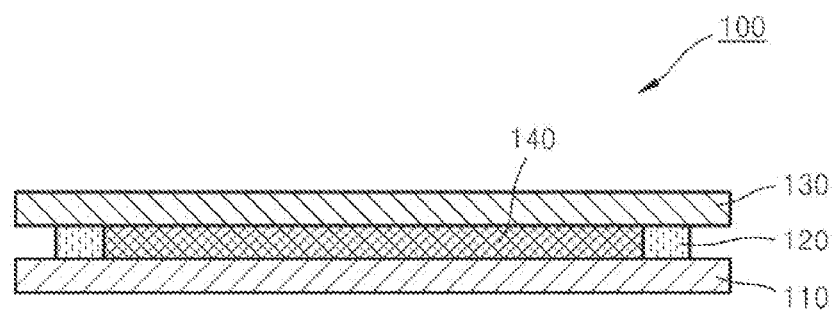
FIG. 1 is a sectional view showing the structure of a display device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

Unless otherwise defined, all terms used herein, including technical or scientific terms, have the same meanings as those generally understood by those with ordinary knowledge in the field of art to which the aspects of the present invention belong. Such terms as those defined in a generally used dictionary are to be interpreted to have the meanings equal to the contextual meanings in the relevant field of art, and are not to be interpreted to have ideal or excessively formal meanings unless clearly defined in the aspects of the present application.

FIG. 1 is a sectional view showing the structure of a display device 100 according to an embodiment of the present invention. The display device 100 may include a display panel 110, and a transparent protective member 130. The display panel 110 includes pixels, driving circuits, and a sealing substrate that are formed on low-temperature poly-crystalline silicon (LTPS) substrate. The transparent protective member 130 is disposed on a surface of the display panel 110, the surface on which images are displayed. A transparent filling layer 140 may be disposed in a space between the display panel 110 and the transparent protective member 130, such that the brightness characteristic and outdoor visibility of the display device 100 are improved. Finally, the display panel 110 and the transparent protective member 130 are pressed together with the transparent filling layer 140 therebetween forming the display device 100.

The transparent protective member 130 may be formed of a polymer plastic, such as poly(methyl methacrylate) (PMMA), polycarbonate (PC), or the like, a glass substrate, or the like. Since a polymer plastic is flexible, any type of the transparent fillings 140 may be used. However, since a glass substrate is not flexible, if the transparent protective member 130 is embodied by using a glass substrate, a method of forming the transparent filling layer 140 by applying and hardening a liquid-type transparent filling 140a is widely used. Examples of the liquid-type transparent filling 140a may include an ultraviolet (UV)-hardening type acrylic material or resin, or a thermal-hardening type acrylic material or resin. However, due to characteristics of the liquid-type transparent filling layer 140a, defects, such as overflowing liquid or insufficient liquid, may occur during the fabrication process, and thus it is necessary to appropriately control the liquid-type transparent filling 140a.

Therefore, a dam unit 120 is formed between the transparent protective member 130 and the display panel 110 as a partitioning wall near the edges of the display panel 110, and defines a space to be filled with the liquid-type transparent filling 140a. The transparent filling layer 140 fills a space defined by the display panel 110, the dam unit 120, and the transparent protective member 130.

To reduce the loss of brightness of the display device 100 and to improve the visibility of the display device 100 by removing light noise due to an external light, it is necessary to evenly apply the transparent filling layer 140. However, since the liquid-type transparent filling 140a has a surface tension, it is difficult to evenly apply the transparent filling layer 140 at locations nearby the dam unit 120.

Figure 2:
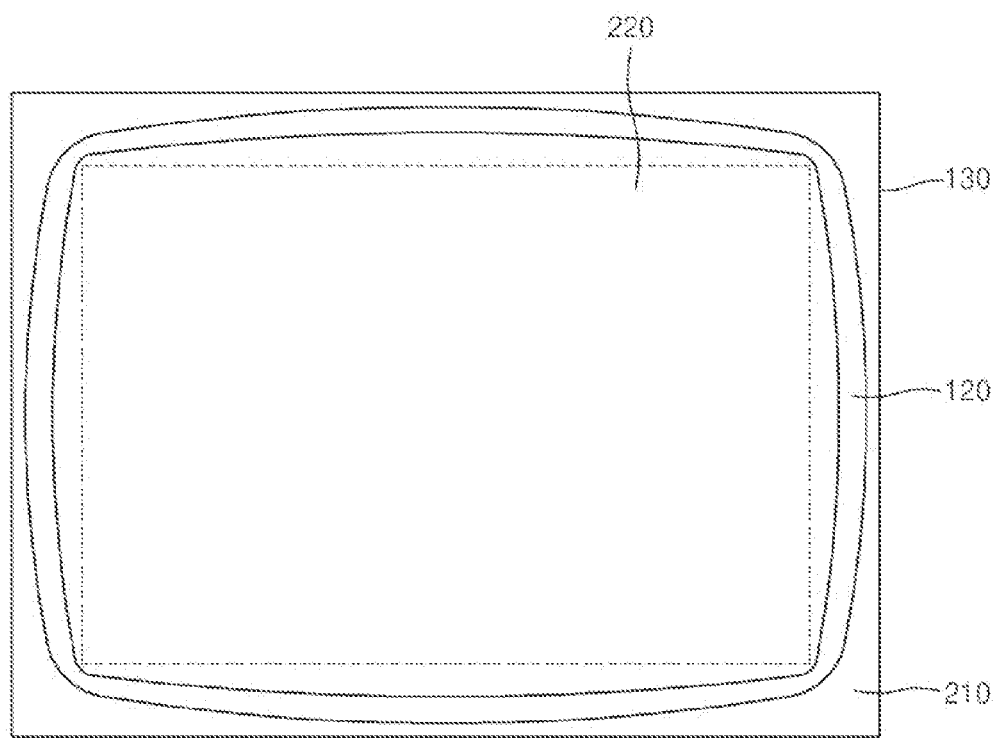
FIG. 2 is a plan view showing a transparent protective member and a dam unit, according to an embodiment of the present invention.

FIG. 2 is a plan view showing the transparent protective member 130 and the dam unit 120, according to an embodiment of the present invention.

As shown in FIG. 2, walls of the dam unit 120 are formed to be convex. The height of the dam unit 120 may be determined based on the height of the transparent filling layer 140. The height of the transparent filling layer 140 may be determined based on the viscosity of the transparent filling layer 140, adhesiveness of the transparent filling layer 140, and structural factors for hardening the transparent filling layer 140. Furthermore, the transparent protective member 130 may include a display region 220 corresponding to a region of the display panel 110 on which an image is displayed and a non-display region 210 corresponding to a region of the display panel 110 on which an image is not displayed, where the dam unit 120 is formed in the non-display region 210 of the transparent protective member 130.

Since the walls of the dam unit 210 define a space to be filled with the transparent filling layer 140, and have a convex shape, the transparent filling layer 140 may be evenly distributed in the space to be filled. Since the liquid-type transparent filling 140a has a surface tension, the liquid-type transparent filling 140a spreads between the transparent protective member 130 and the display panel 110 as the edges of the liquid-type transparent filling 140a spread. The inner walls of the dam unit 120 are formed to have curved surfaces to accommodate the flow and spreading shapes of the liquid-type transparent filling 140a. Therefore, when the liquid-type transparent filling 140a spreads out, as the display panel 110 and the transparent protective member 130 are pressed toward each other, the formation of non-filled regions, on which the liquid-type transparent filling 140a is not located, and overfilled regions, on which the liquid-type transparent filling 140a overflows due to excessive concentration, may be prevented. Thus the liquid-type transparent filling layer 140 may be evenly applied throughout the space to be filled with the liquid-type transparent filling 140a.

Although FIG. 2 shows an example in which the display panel 110 is formed to have a rectangular shape, the display panel 110 may be formed to have any of various shapes including polygons, such as triangles, pentagons, and hexagons, ellipses, and circles. In the case where the display panel 110 is formed to have a shape of a polygon, the walls of the dam unit 120 according to an embodiment of the present invention may be formed such that, the distance between the edges of the walls of the dam unit 120 and the edges of the polygon increase in a direction extending from centers of the edges of the polygon to the vertexes of the polygon.

FIGS. 3A through 3F are diagrams showing a method of manufacturing a display device, according to an embodiment of the present invention.

Figure 3A:
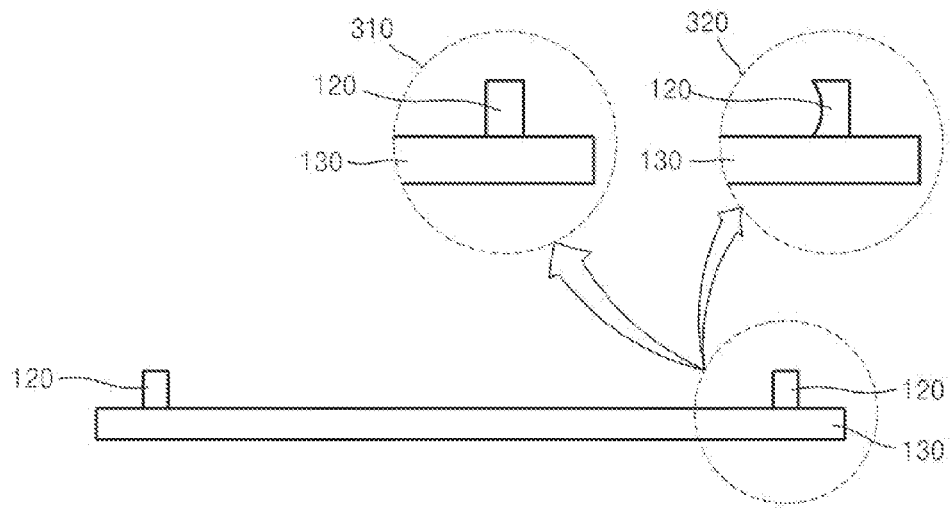
FIGS. 3A through 3F are diagrams showing a method of manufacturing a display device, according to an embodiment of the present invention.

First, as shown in FIG. 3A, the dam unit 120 is formed on the transparent protective member 130. The dam unit 120 is formed on a surface of the transparent protective member 130 facing the display panel 110. The dam unit 120 may be formed by using a method such as ink printing, taping, hardening resin patterning, etc. The dam unit 120 may be formed of a transparent material. Furthermore, the hardening resin may be an acrylic material, an adhesive, or the like. The inner walls of the dam unit 120 may be formed to be perpendicular to the surface of the transparent protective member 130 facing the display panel 110. Alternatively, the inner walls of the dam unit 120 may be concave. When the inner walls of the dam unit 120 are concave, the spreading characteristics of the liquid-type transparent filling 140a may be improved, and thus the transparent filling layer 140 may be disposed to contact the dam unit 120 more tightly.

Figure 3B:
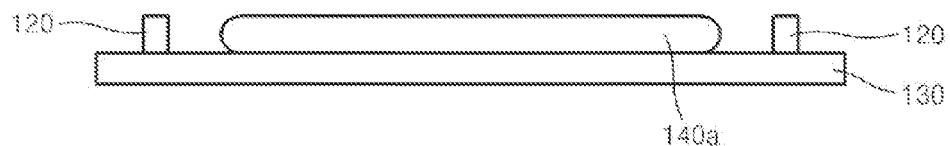
Figure 3C:
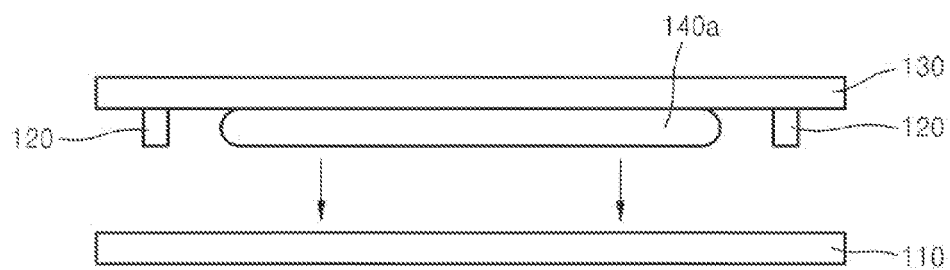

Next, as shown in FIG. 3B, the liquid-type transparent filling 140a is deposited inside the dam unit 120 formed on the transparent protective member 130. A shape in which the liquid-type transparent filling 140a is applied may be determined, based on the spreading characteristic of the liquid-type transparent filling 140a, such that, when the transparent protective member 130 and the display panel 110 are pressed toward each other, the liquid-type transparent filling 140a spreads evenly. For example, the liquid-type transparent filling 140a may be deposited in the shape shown in FIG. 6. Furthermore, when the liquid-type transparent filling 140a is deposited, any of various methods, e.g., a method disclosed in Japanese Patent Laid-Open Publication No. 2009-48214, which is included in the present application as a reference, may be used to deposit the liquid-type transparent filling 140.

When the application of the liquid-type transparent filling 140a onto the transparent protective member 130 is completed, the transparent protective member 130, on which the liquid-type transparent filling 140a is deposited, is turned upside down and is arranged on the display panel 110.

Figure 3D:
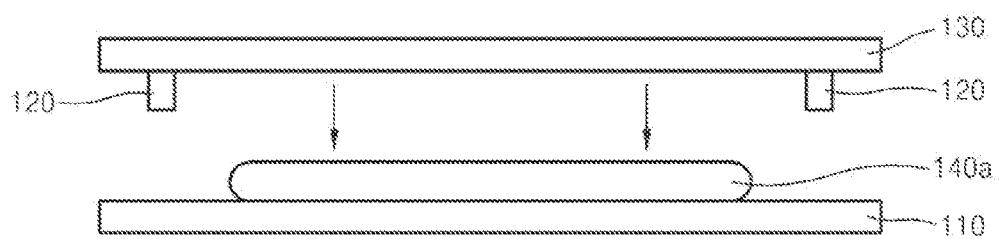

Alternatively, as shown in FIG. 3D, the liquid-type transparent filling 140a may be deposited on the display panel 110. In this case, the liquid-type transparent filling 140a is deposited on the display panel 110, such that the liquid-type transparent filling 140a is distributed inside the dam unit 120 on the transparent protective member 130 when the liquid-type transparent filling 140a is pressed against the display panel 110.

Figure 3E:
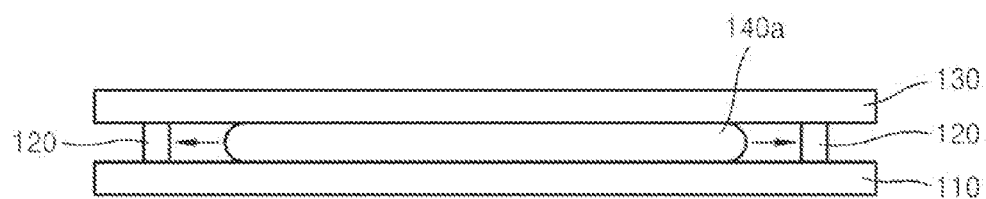

Next, as shown in FIG. 3E, the display panel 110 and the transparent protective member 130 are pressed toward each other. As the display panel 110 and the transparent protective member 130 are pressed toward each other, the liquid-type transparent filling 140a spreads in a space formed by the display panel 110, the dam unit 120, and the transparent protective member 130.

Figure 3F:
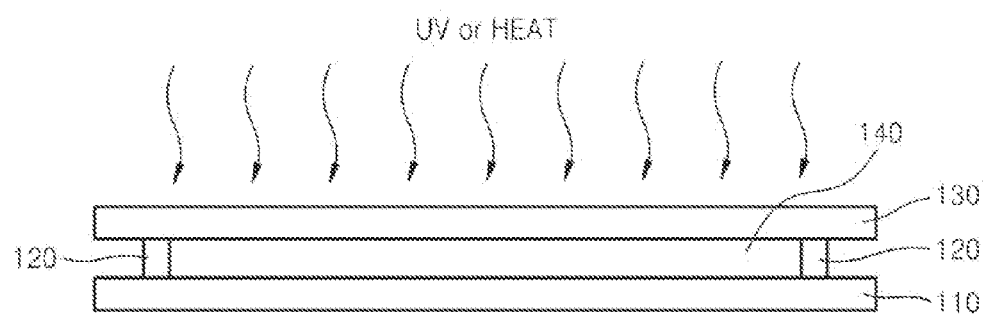

After the liquid-type transparent filling 140a spreads in the space filled with the liquid-type transparent filling 140a, the liquid-type transparent filling 140a is hardened by applying UV rays or heat thereto, as shown in FIG. 3F. The liquid-type transparent filling 140a may be either a UV-hardening type or a thermal-hardening type transparent filling, and either UV rays or heat is applied to the liquid-type transparent filling 140a according to the type of the liquid-type transparent filling 140a to harden the liquid-type transparent filling 140a.

Figure 4:
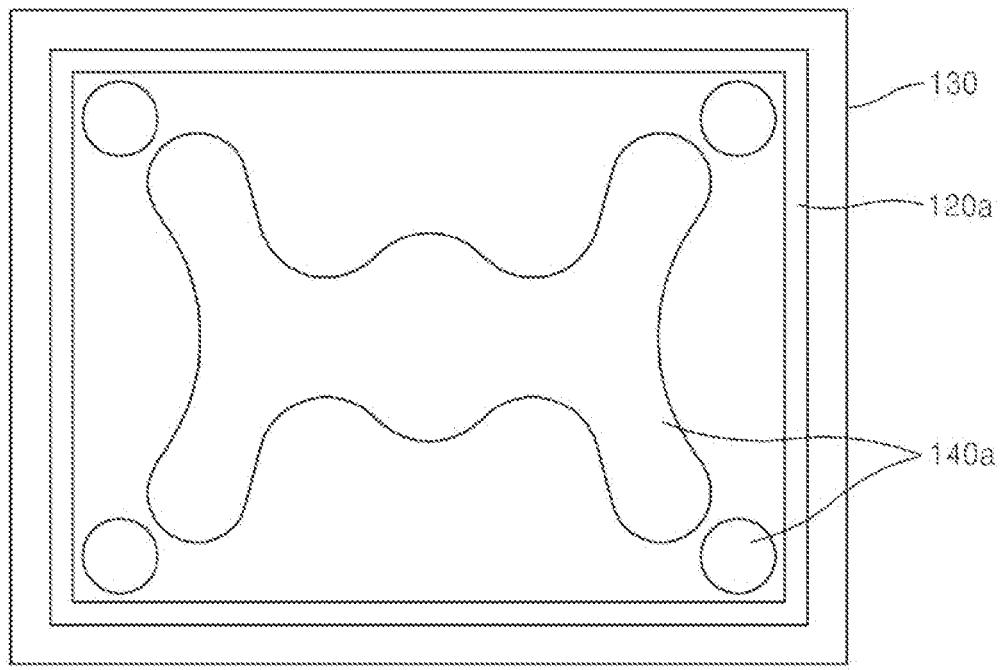
FIGS. 4 and 5 are diagrams showing the transparent protective member, a dam unit, and a liquid-type transparent filling, according to a comparative embodiment of the present invention.
Figure 5:
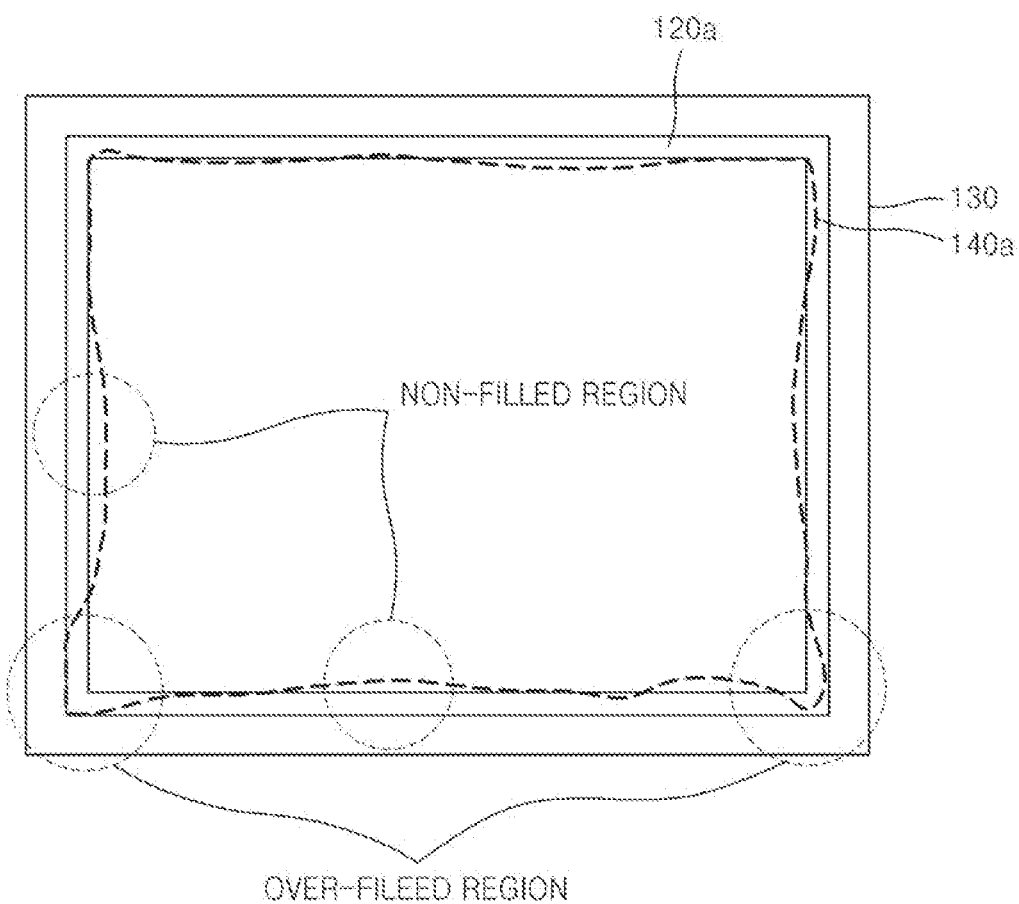

FIGS. 4 and 5 are diagrams showing the transparent protective member 130, a dam unit 120a, and the liquid-type transparent filling 140a, according to a comparative embodiment of the present invention. Aspects of the present invention will be described by comparing the comparative embodiment of the present invention and embodiments of the present invention.

As shown in FIGS. 4 and 5, the rectangular dam unit 120a is formed near the edges of the display panel 110. As shown in FIG. 4, the liquid-type transparent filling 140a is deposited inside the rectangular dam unit 120a. After the liquid-type transparent filling 140a is deposited inside the rectangular dam unit 120a, the display panel 110 and the transparent protective member 130 are pressed toward each other. As a result, the liquid-type transparent filling 140a spreads in a space formed by the display panel 110, the dam unit 120a, and the transparent protective member 130, as shown in FIG. 5.

However, since the dam unit 120a has a rectangular shape, the liquid-type transparent filling 140a may not spread evenly at locations near the inner walls of the dam unit 120a. As a result, non-filled regions on which the liquid-type transparent filling 140a is not deposited, and overflowing regions on which the liquid-type transparent filling 140a overflows due to excessive concentration may be formed. In areas where non-filled regions are formed, bubbles may appear in the transparent filling layer 140. Therefore, when a user looks at the display device 100, the bubbles may be seen, and the quality of displayed images is deteriorated by the bubbles. In the case where over-filled regions are formed, the display panel 110 and the transparent protective member 130 may not be properly pressed toward each other, and gaps may be formed between the display panel 110 and the transparent protective member 130. Therefore, the formation of non-filled regions or over-filled regions during the application of the liquid-type transparent filling 140a causes defects in the process of manufacturing the display device 100.

Figure 6:
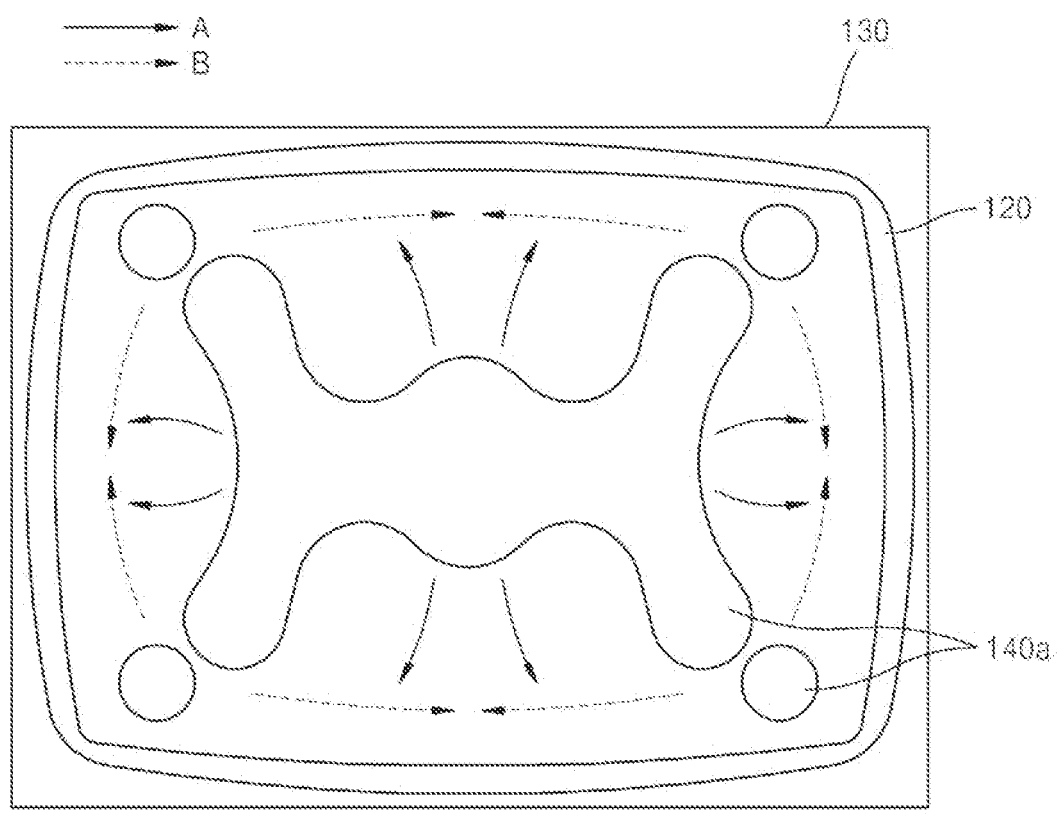
FIG. 6 is a diagram showing the liquid-type transparent filling spreading in the space between the transparent protective member and the display panel, according to an embodiment of the present invention.

FIG. 6 is a diagram showing the liquid-type transparent filling 140a spreading in the space between the transparent protective member 130 and the display panel 110, according to another embodiment of the present invention.

The dam unit 120 is formed to have concave shaped inner walls. That is, the inner walls are shaped from the inside of the display panel 110 to the outside of the display panel 110, and thus, when the liquid-type transparent filling 140a spreads, the formation of non-filled regions or over-filled regions may be significantly reduced. When the liquid-type transparent filling 140a spreads from the center toward the dam unit 120 (A), the liquid-type transparent filling 140a spreads in a circular shape due to the stress of the liquid-type transparent filling 140a. Here, since the inner walls of the dam unit 120 are concave outward, the liquid-type transparent filling 140a and the inner walls of the dam unit 120 may contact each other more tightly, and formation of non-filled regions or over-filled regions may be prevented. Furthermore, when the liquid-type transparent filling 140a flows along the inner walls of the dam unit 120 (B), the liquid-type transparent filling 140a may flow along the curved inner walls of the dam unit 120 and spread in a circular manner. All this is done while maintaining the characteristic of the liquid-type transparent filling 140a to be spread in a circular shape. Accordingly, the inner walls of the dam unit 120 form a flow path through which flowing characteristics of the liquid-type transparent filling 140a are reflected, and thus the formation of non-filled regions or over-filled regions may be prevented.

Figure 7:
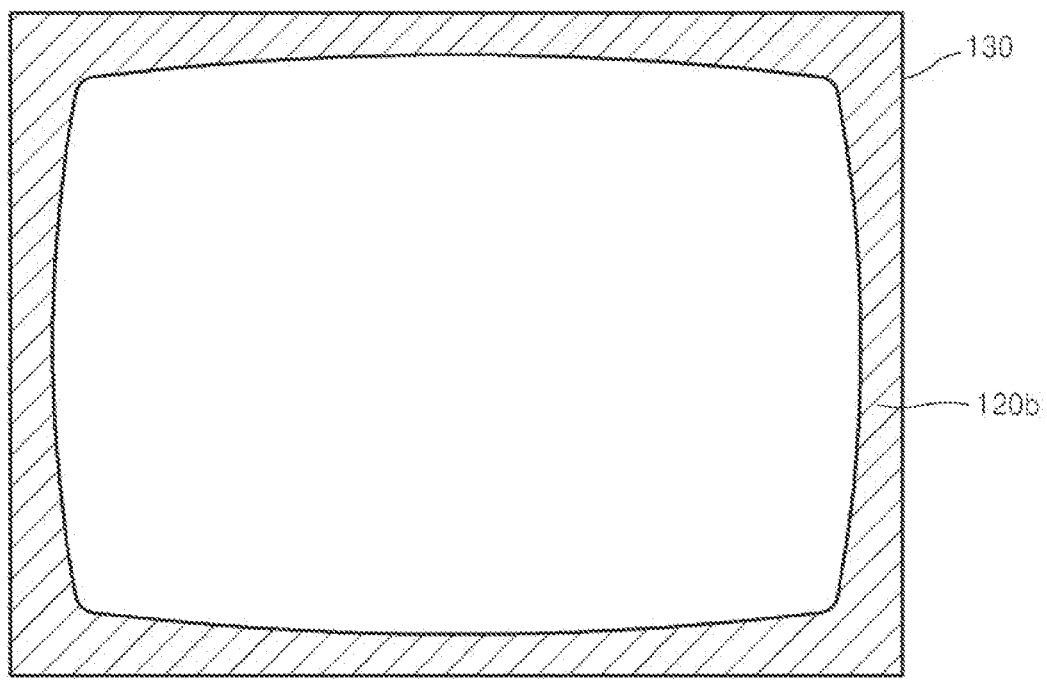
FIG. 7 is a diagram showing a shape of a dam unit according to another embodiment of the present invention.
Figure 8:
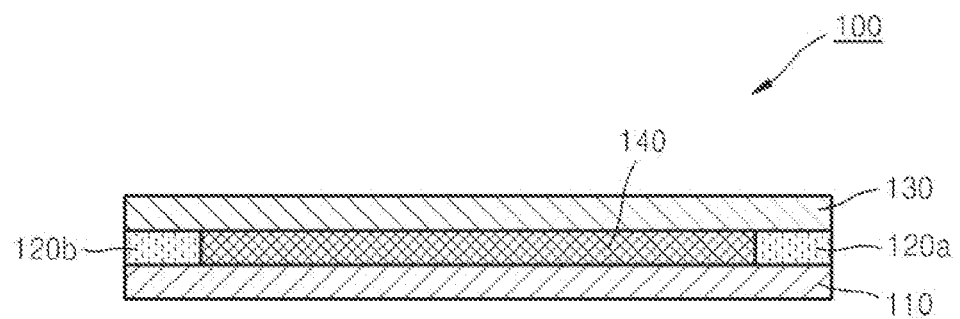
FIG. 8 is a sectional view of the display device according to another embodiment of the present invention.

FIG. 7 is a diagram showing a shape of a dam unit 120b according to another embodiment of the present invention, and FIG. 8 is a sectional view of the display device 100 according to another embodiment of the present invention.

The outer walls of the dam unit 120 may be formed to have any of various shapes according to embodiments of the present invention. According to another embodiment of the present invention as shown in FIGS. 7 and 8, the outer walls of the dam unit 120b may be formed to correspond to the edges of the display panel 110. In this case, the dam unit 120b may function as an adhesive member or a sealing member for adhering or sealing the display panel 110 and the transparent protective member 130.

While aspects of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
a display panel to display an image on a display surface of the display panel;
a transparent protective member arranged on the display surface;
a dam unit interposed between the display panel and the transparent protective member and formed to correspond to edges of the display panel; and
a transparent filling layer that fills a space formed by the display panel, the transparent protective member, and the dam unit,
wherein walls of the dam unit are outwardly bent in a direction extending from an inside surface of the display panel to an outside surface of the display panel, and
wherein display panel has a shape of a polygon, and the walls of the dam unit are formed such that, a distance between edges of the walls of the dam unit and edges of the polygon increase from centers of the edges of the polygon to the vertexes of the polygon.

2. The display device of claim 1, wherein outer walls of the dam unit are formed parallel with inner walls of the dam unit.

3. The display device of claim 1, wherein outer walls of the dam unit are formed adjacent to the edges of the display panel.

4. The display device of claim 1, wherein the dam unit is formed by ink-printing a pattern of the dam unit on the transparent protective member.

5. The display device of claim 1, wherein the dam unit is formed by taping a pattern of the dam unit on the transparent protective member.

6. The display device of claim 1, wherein the dam unit is formed by applying a hardening resin on the transparent protective member and hardening the hardening resin.

7. The display device of claim 1, wherein the transparent protective member is a glass substrate, and the transparent filling layer is formed by hardening a liquid-type transparent filling.

8. The display device of claim 1, wherein the transparent filling is an acrylic material or resin.

9. The display device of claim 1, wherein inner walls of the dam unit are concave.

10. A method of manufacturing a display device, the method comprising:
forming a dam unit on a transparent protective member, arranged on a display panel, adjacent to edges of the display panel, the dam unit having a plurality of sides, each side having a curvature;
depositing a liquid-type transparent filling on the transparent protective member, such that the dam unit and the liquid-type transparent filling are interposed between the transparent protective member and the display panel;
pressing the transparent protective member and the display panel toward each other; and
hardening the liquid-type transparent filling,
wherein the display panel has a polygon shape, and the sides of the dam unit are formed such that, a distance between edges of the sides of the dam unit and edges of the polygon increase from centers of the edges of the polygon to vertexes of the polygon.

11. The method of claim 10, wherein outer walls of the dam unit are formed parallel with inner walls of the dam unit.

12. The method of claim 10, wherein outer walls of the dam unit are formed along the edges of the display panel.

13. The method of claim 10, wherein the dam unit is formed by ink-printing a pattern of the dam unit on the transparent protective member.

14. The method of claim 10, wherein the dam unit is formed by taping a pattern of the dam unit on the transparent protective member.

15. The method of claim 10, wherein the forming of the dam unit comprises:
applying a hardening resin on the transparent protective member; and
hardening the hardening resin.

16. The method of claim 10, wherein the transparent protective member is a glass substrate.

17. The method of claim 10, wherein the transparent filling is an acrylic material or resin.

18. The method of claim 10, wherein inner walls of the dam unit are concave.

* * * * *